US008220582B2

(12) United States Patent
Toyokawa et al.

(10) Patent No.: US 8,220,582 B2
(45) Date of Patent: Jul. 17, 2012

(54) WORKING VEHICLE

(75) Inventors: Mitsuo Toyokawa, Ehime-ken (JP);
Shingo Fujioka, Ehime-ken (JP);
Yusuke Murakami, Ehime-ken (JP);
Tomoaki Watanabe, Ehime-ken (JP);
Masahiko Yoshino, Ehime-ken (JP);
Hiroto Mori, Ehime-ken (JP); **Noboru
Sagawa, Ehime-ken (JP); Kiyofumi
Sakurahara**, Ehime-ken (JP)

(73) Assignee: Iseki & Co., Ltd., Ehime-ken (JP)

( * ) Notice: Subject to any disclaimer, the term of this patent is extended or adjusted under 35 U.S.C. 154(b) by 130 days.

(21) Appl. No.: 12/785,609

(22) Filed: May 24, 2010

(65) Prior Publication Data
US 2011/0203868 A1    Aug. 25, 2011

(30) Foreign Application Priority Data

Feb. 24, 2010  (JP) ................................ 2010-039008

(51) Int. Cl.
*B60K 20/00* (2006.01)
(52) U.S. Cl. ....................... 180/336; 74/473.1
(58) Field of Classification Search .................. 180/336, 180/364, 366; 74/473.16, 473.17, 178, 518, 74/478, 512, 473.1
See application file for complete search history.

(56) References Cited

U.S. PATENT DOCUMENTS

| 4,883,137 | A |   | 11/1989 | Wanie et al. |
| 5,586,955 | A | * | 12/1996 | Wanie .............................. 477/99 |
| 5,842,378 | A |   | 12/1998 | Zellmer |
| 6,237,711 | B1 | * | 5/2001 | Hunt .............................. 180/336 |
| 7,458,438 | B2 | * | 12/2008 | Nishino et al. ................. 180/305 |
| 2009/0044652 | A1 |   | 2/2009 | Nishino |

FOREIGN PATENT DOCUMENTS

| JP | 2004-028309 | 1/2004 |
| JP | 2008-183964 | 8/2008 |

* cited by examiner

*Primary Examiner* — Joseph Rocca
(74) *Attorney, Agent, or Firm* — Greenblum & Bernstein, P.L.C.

(57) ABSTRACT

A working vehicle includes a HST, forward and reverse pedals, a brake pedal, an intermediate link mechanism (ILM) operating in linkage with operation of the forward or reverse (F or R) pedal, a single shift rod receiving the operation from the ILM and rotating a trunnion shaft of the HST to a forward drive side and to a reverse drive side, a neutral return mechanism (NRM) having a cam plate rotating integrally with the trunnion shaft and forming a curved surface portion, a roller moving in contact with the curved surface portion, a lower return arm configured integrally with a return arm that includes the roller, and a first spring acting in a direction of returning the trunnion shaft to a neutral position, a lower return arm onto which the first spring is latched, a F pedal onto which is latched a second spring acting in a direction of returning the trunnion shaft to the neutral position when depression operation of the F or R pedals is not being performed, an ILM including a damper applying a resistance to movements of the F or R pedals, and the NRM disposed between a rear wheel and a fender of the working vehicle in side view.

2 Claims, 20 Drawing Sheets

FIG. 7
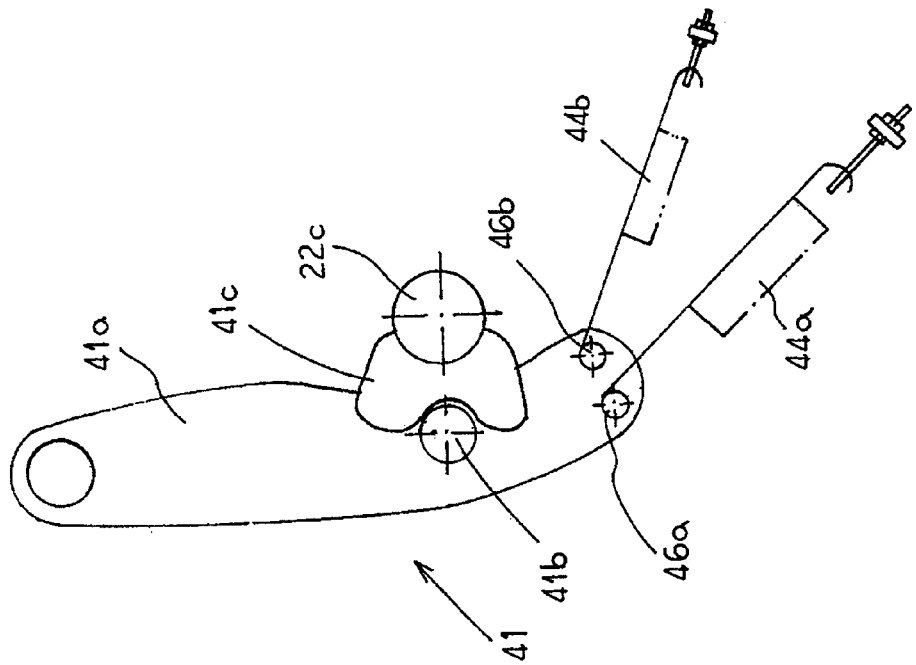
(A)
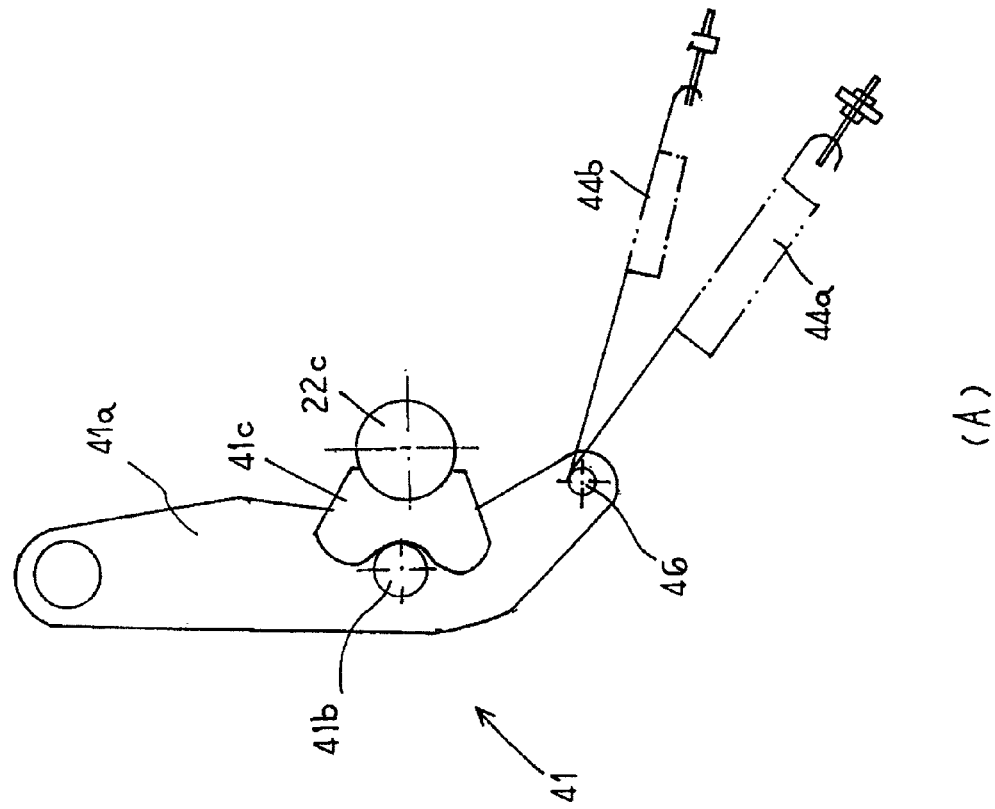
(B)

F I G. 1 7
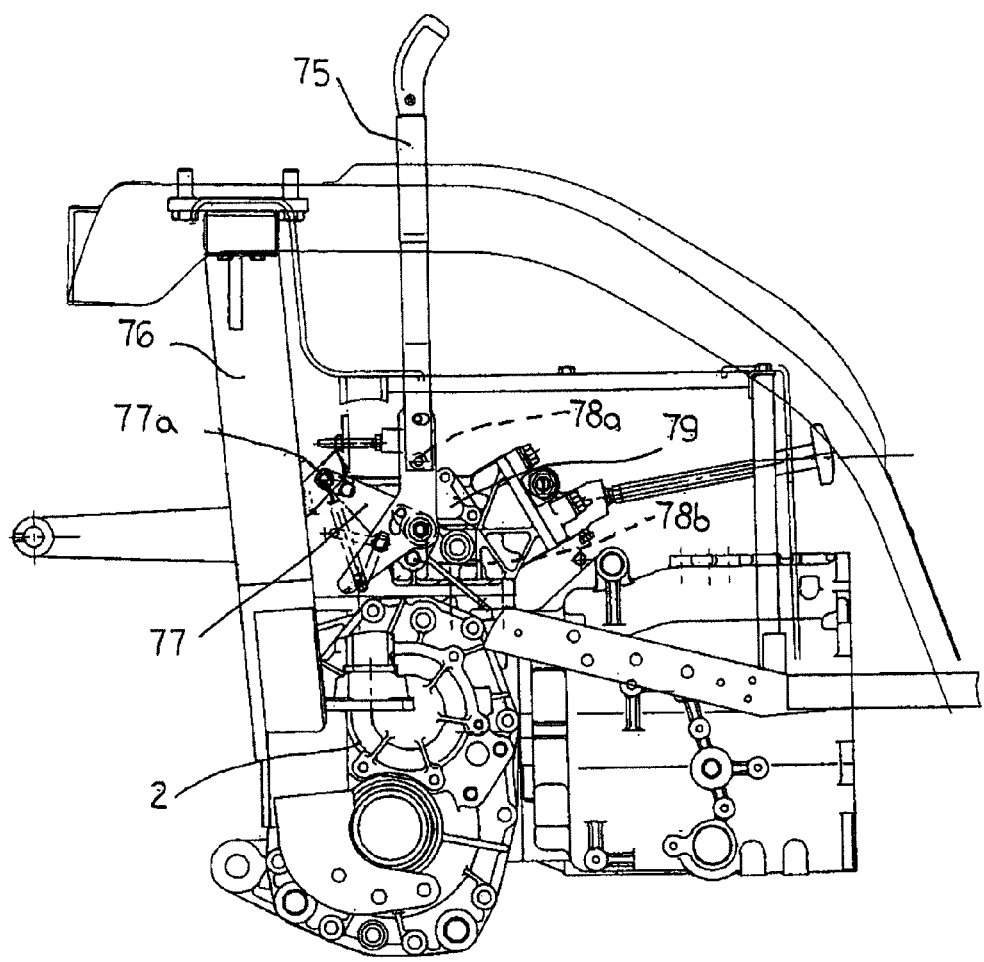

WORKING VEHICLE

BACKGROUND OF THE INVENTION

The present invention relates to a working vehicle that drives by changing speed by a hydrostatic continuously variable transmission (HST).

A working vehicle is known that includes an HST, a forward pedal, a reverse pedal, and a neutral return mechanism that returns the forward pedal and the reverse pedal to neutral positions (Japanese Published Unexamined Patent Application No. 2008-183964).

There is also known an arrangement that includes a hydrostatic continuously variable transmission (HST) to which a driving power of an engine is transmitted, a trunnion shaft disposed inside the HST shifting an output of the HST from a vehicle forward drive direction to a reverse drive direction, a forward pedal and a reverse pedal changing, in accordance with depression amounts, a rotation angle of the trunnion shaft into the forward drive direction and the reverse drive direction, and a neutral return apparatus for returning the forward pedal and the reverse pedal to neutral positions (Japanese Published Unexamined Patent Application No. 2004-28309).

SUMMARY OF THE INVENTION

With a neutral return mechanism that returns a trunnion shaft of a hydrostatic continuously variable transmission to a neutral position directly, deterioration with age causes increased resistance against return and makes return to the neutral position difficult. In an arrangement in which operations of forward and reverse pedals are transmitted via an intermediate link mechanism to shift the trunnion shaft of the hydrostatic continuously variable transmission, the above trend is especially strong due to resistance of the intermediate link mechanism, etc.

An object of the present invention is thus to provide a working vehicle with which an intermediate link mechanism that links forward and reverse pedals is improved to facilitate return to neutral positions and facilitate inspection work.

To achieve the above object, the present invention provides the following technical means.

That is, a working vehicle having a vehicle body frame (5) comprising: a front wheel (3); a rear wheel (4); a fender (55) disposed at a position covering the rear wheel (4) from above; a hydrostatic continuously variable transmission (22) having a trunnion shaft (22c); a forward pedal (14); a reverse pedal (15); a brake pedal (31); an intermediate link mechanism (36) operating in linkage with operation of the forward pedal (14) or the reverse pedal (15) and coupled to the forward pedal (14) and the reverse pedal (15) respectively; a single shift rod (38) receiving the operation from the intermediate link mechanism (36) and rotating the trunnion shaft (22c) of the hydrostatic continuously variable transmission (22) from a forward drive side to a reverse drive side; a second spring (45) latched between a tip of the forward pedal (14) and the trunnion shaft (22c) to make the trunnion shaft (22c) act in a direction of returning to a neutral position when depression operation of the forward and reverse pedals (14, 15) is not being performed; a damper (36e) disposed at an end of the opposite side to that of the intermediate link mechanism (36) coupled to the forward pedal (14) and the reverse pedal (15) for applying resistance to movements of the forward and the reverse pedals (14, 15); and a neutral return mechanism (41) disposed between the rear wheel (4) and the fender (55) in side view and having a cam plate (41c) rotating integrally with the trunnion shaft (22c) and forming a curved surface portion (41c1), a roller (41b) moving in contact with the curved surface portion (41c1), a lower return arm (41aL) having the roller (41b) mounted thereon, a return arm (41a) having one end fixed to the lower return arm (41aL), and a first spring (44) latched to another end of the lower return arm (41aL) and acting in a direction of returning the trunnion shaft (22c) to the neutral position.

A second aspect of the present invention is the working vehicle according to the first aspect of the present invention which includes an operation arm (41d) for adjusting the trunnion shaft (22c) to the neutral position by displacing rotational axis centers of the return arm (41a) and the lower return arm (41aL).

With the first aspect of the present invention, when a foot is removed from the forward or reverse pedal (14, 15), the intermediate link mechanism (36) and the forward or reverse pedal (14, 15) return to the neutral position by being pulled by the second spring (45). The trunnion shaft (22c) of the hydrostatic continuously variable transmission (22) can be returned to the neutral position directly by the first spring (44) and the neutral return mechanism (41). In particular, smooth return without resistance is made possible because the roller (41) is in contact with the curved surface portion (41c1) of the cam plate (41c). Also, the return of the forward pedal (14) to the neutral position is performed smoothly because the second spring (45) acts directly on the forward drive pedal to return it to the neutral side. In comparison to the reverse drive side, movement at high speed is mostly performed at the forward drive side, and by the return of the forward pedal (14) to the neutral position being performed smoothly, time until stoppage from release of the foot from the forward pedal (14) is shortened.

Also, shock during depression of the forward or reverse pedal (14, 15) can be alleviated because the damper (36e) that makes the movements of the forward and reverse pedals (14, 15) gentle is provided. The forward and reverse pedals (14, 15) can also be prevented from returning to the neutral position rapidly when the foot is released from the forward or reverse pedal (14, 15) because the damper (36e) acts as a resistance.

The neutral return mechanism (41) is disposed between the rear wheel (4) and the fender (55) of the working vehicle in side view, and adjustment and inspection of the neutral return mechanism (41) can thus be performed easily from a gap portion between the rear wheel (4) and the fender (55).

With the second aspect of the present invention, in addition to the effects of the first aspect of the invention, adjustment of the neutral position of the trunnion shaft (22c) is made easy because of the arrangement that includes operation arm (41d) for adjusting the trunnion shaft (22c) to the neutral position by displacing the rotational axis centers of the return arm (41a) and the lower return arm (41aL). In particular, deviation of the neutral position of the trunnion shaft (22c) occurs due to deterioration with age of the vehicle body, and the adjustment of the neutral position of the trunnion shaft (22c) can be performed promptly to resolve this deviation as well as to resolve dimensional errors in every vehicle body during assembly and maintenance.

BRIEF DESCRIPTION OF THE DRAWINGS

FIG. 7 shows side views of the neutral return mechanism.

FIG. 17 is a side view of a transmission and a working machine lifting or lowering lever.

DESCRIPTION OF THE PREFERRED EMBODIMENT

An embodiment in which the present invention is applied to a farm tractor shall now be described with reference to the drawings.

Figure 1:
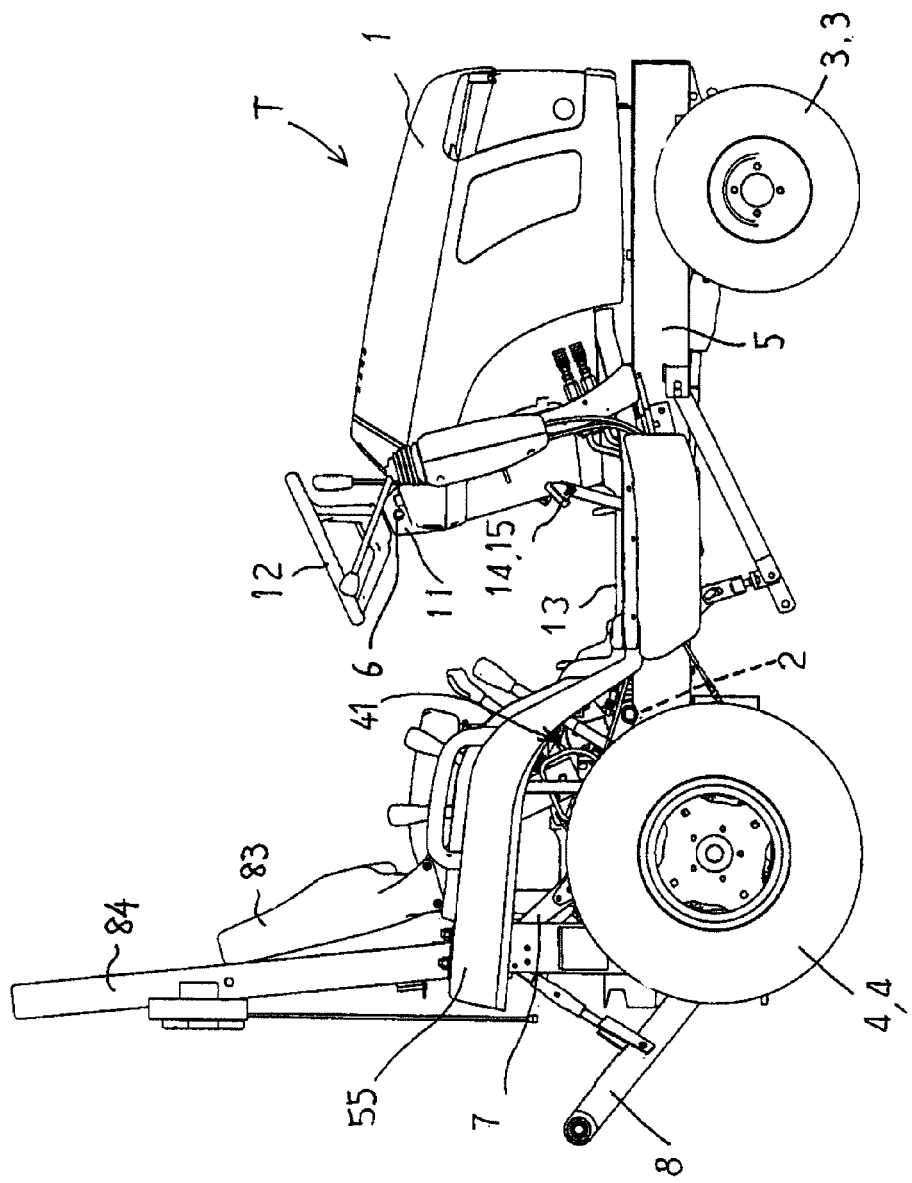
FIG. 1 is an overall side view of a tractor.

As shown in FIG. 1, the tractor T has an engine (not shown) disposed in a bonnet 1 at a front side of a vehicle body, and the engine is set and fixed on a chassis frame 5. Rotational power of the engine is transmitted to right and left front wheels 3 and right and left rear wheels 4 via a transmission mechanism inside a transmission case 2.

A cylinder case (not shown), having working vehicle lifting/lowering hydraulic cylinders (not shown) installed therein, is disposed at a rear upper portion of the transmission case 2, lift arms 7 are pivotally installed in the cylinder case in a manner enabling upward and downward rotation, and the lift arms 7 are configured to be rotated upward and downward by expansion and contraction actions of pistons of the lifting/lowering cylinders (not shown). Also, a link mechanism 8, including an upper link and right and left lower links, is disposed at a rear side of the transmission case 2 and is configured to couple any of various working machines to lift and lower the machine by the lift arms 7.

Also, a steering wheel post 11 is erected at a rear of the engine, and a steering wheel 12 is axially supported at an upper portion of the steering wheel post 11. A floor 13 is disposed at an upper side of the transmission case 2, and a forward pedal 14, a reverse pedal 15, a brake pedal 31, etc., are disposed on the floor 13. The brake pedal is positioned at an opposite side of the forward and reverse pedals with respect to the steering wheel post 11. Also, an accelerator lever 6, which maintains the engine speed at a fixed level, is disposed at an upper portion of the steering wheel post 11. A seat 83, on which a driver sits, a safety frame 84, which secures a space in a vicinity of the seat 83 in case of roll-over, and a fender 55, which covers the rear wheels 4, are disposed on the chassis frame 5.

Arrangements are made so that when the forward or reverse pedal 14 or 15 is depressingly operated, a trunnion shaft 22c of a hydrostatic continuously variable transmission 22 is rotated and an engine speed is increased.

Figure 2:
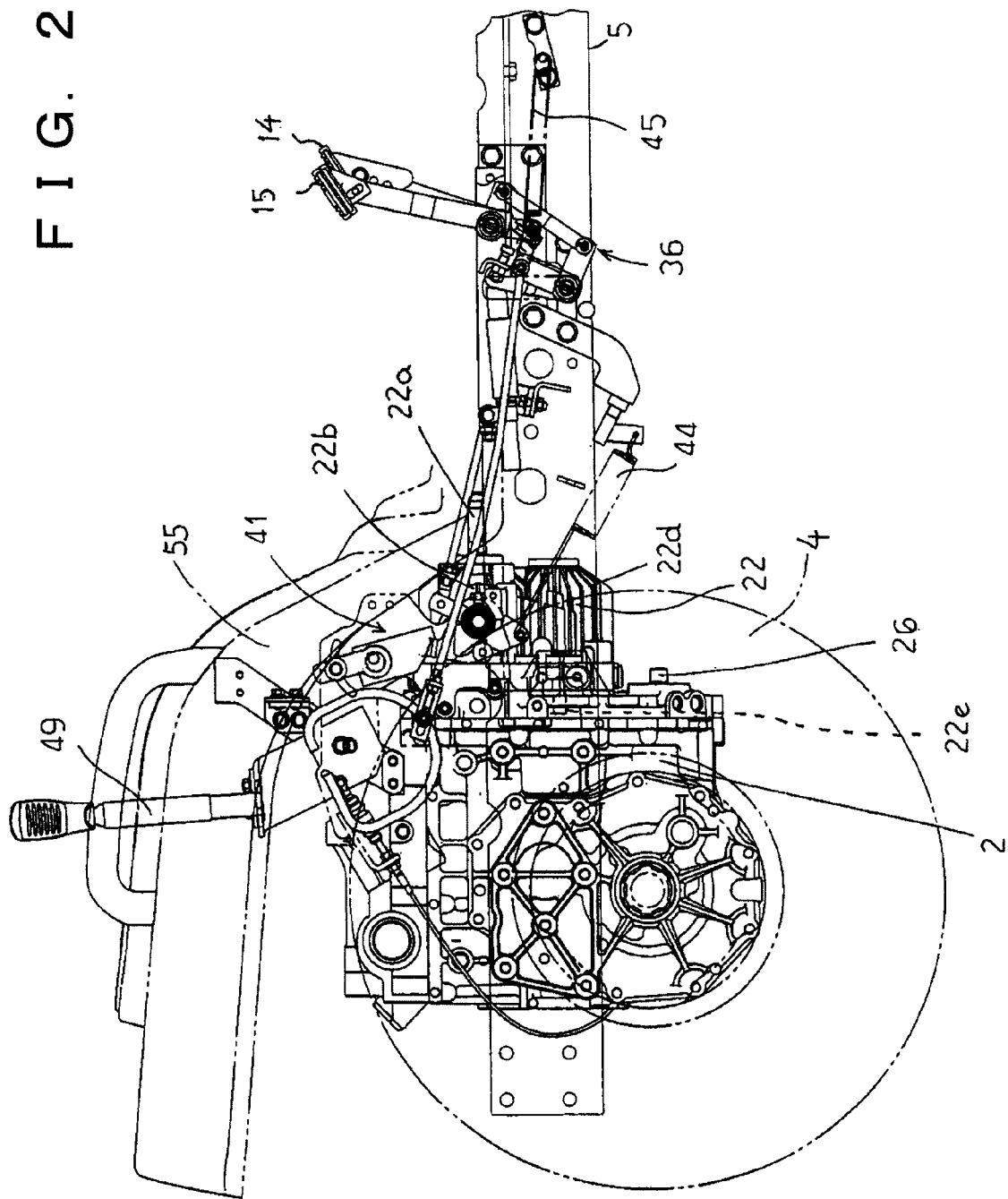
FIG. 2 is a partially omitted side view of a transmission case portion.
Figure 3:
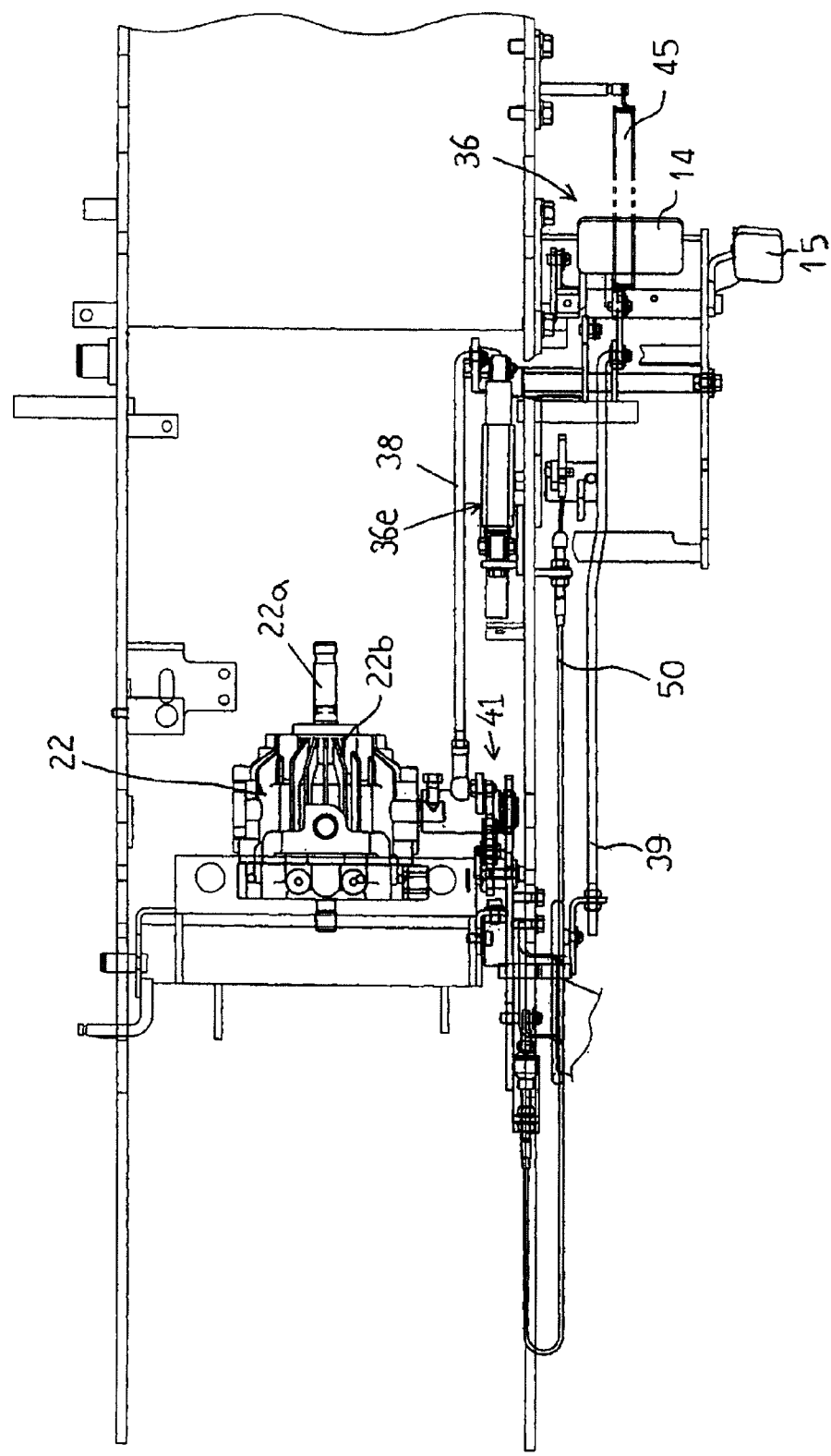
FIG. 3 is a partially omitted plane view of the transmission case portion.
Figure 4:
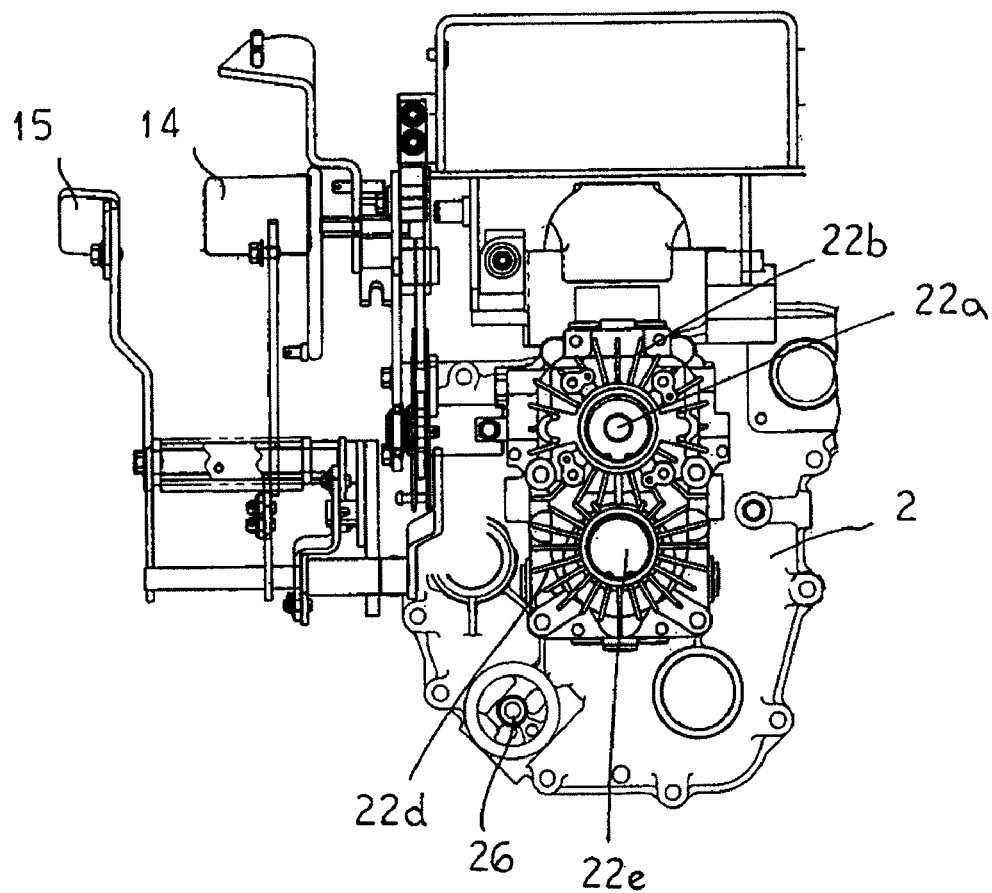
FIG. 4 is a partially omitted front view of the transmission case portion.

Also as shown in FIG. 2 to FIG. 4, the driving power that is output from the engine is output from an input shaft 22a to an output shaft 22e inside the transmission case 2 via the hydrostatic continuously variable transmission 22. The hydrostatic continuously variable transmission 22 is configured with a hydraulic pump 22b and a hydraulic motor 22d, and power is transmitted to the output shaft 22e upon forward/reverse drive switching and stepless shifting of the hydraulic motor 22d by adjustment of the trunnion shaft 22c of the hydraulic pump 22b. The power transmitted to the output shaft 22e is transmitted to the right and left rear wheels 4 via an auxiliary transmission (not shown), etc. inside the transmission case 2. The power is also transmitted to the right and left front wheels 3 via a front wheel transmission shaft (not shown). 26 is a mid-PTO shaft that drives a lawnmower disposed between the front wheels 3 and the rear wheels 4.

Also, the power in the transmission case 2 is transmitted via a PTO clutch (not shown) and a PTO power transmission (not shown) to a PTO speed change mechanism (not shown) and is taken out from a rear PTO shaft (not shown) and the mid-PTO shaft 26.

Figure 5:
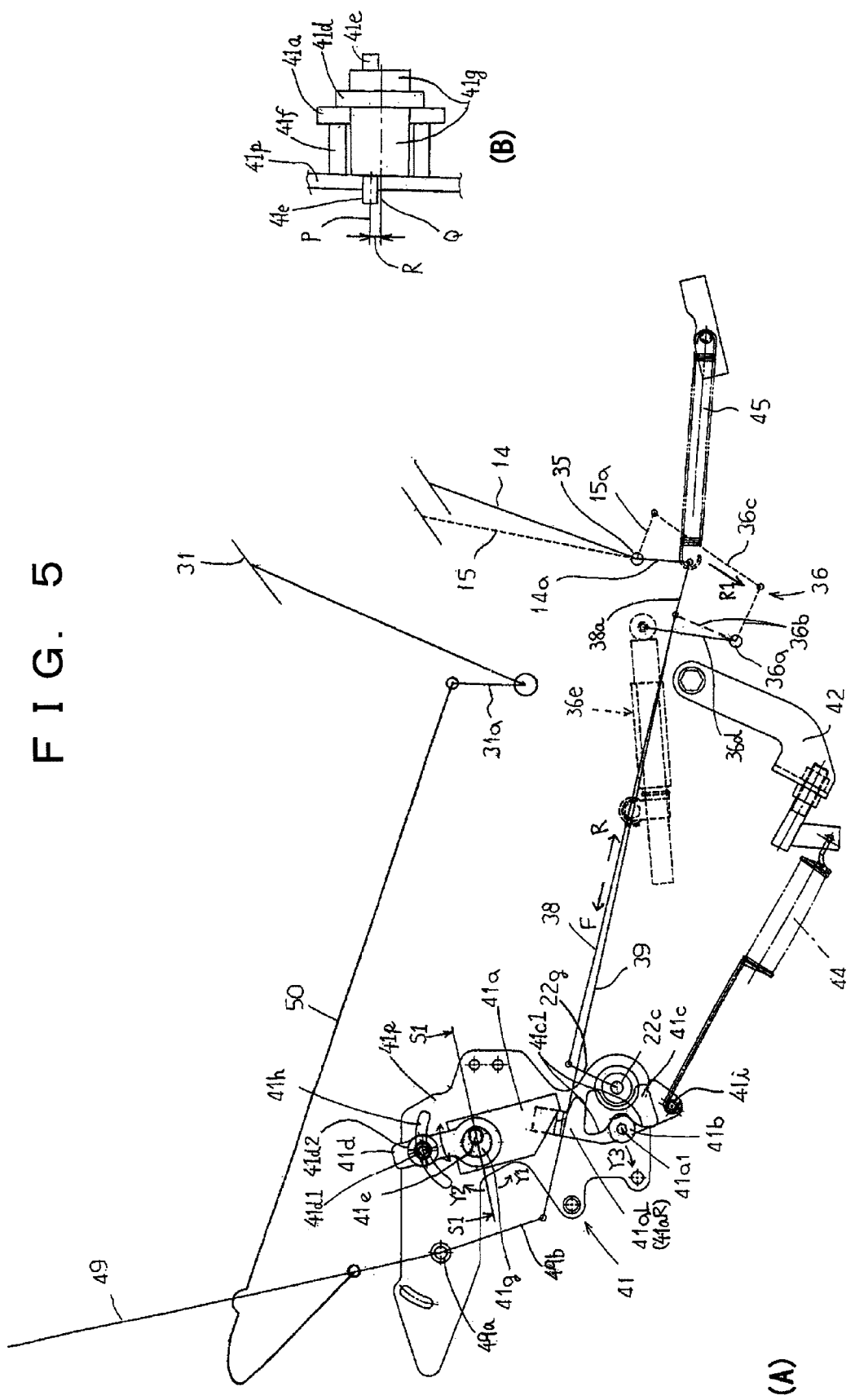
FIG. 5 shows side views of action states of pedals, a neutral return mechanism and an intermediate link mechanism.
Figure 6:
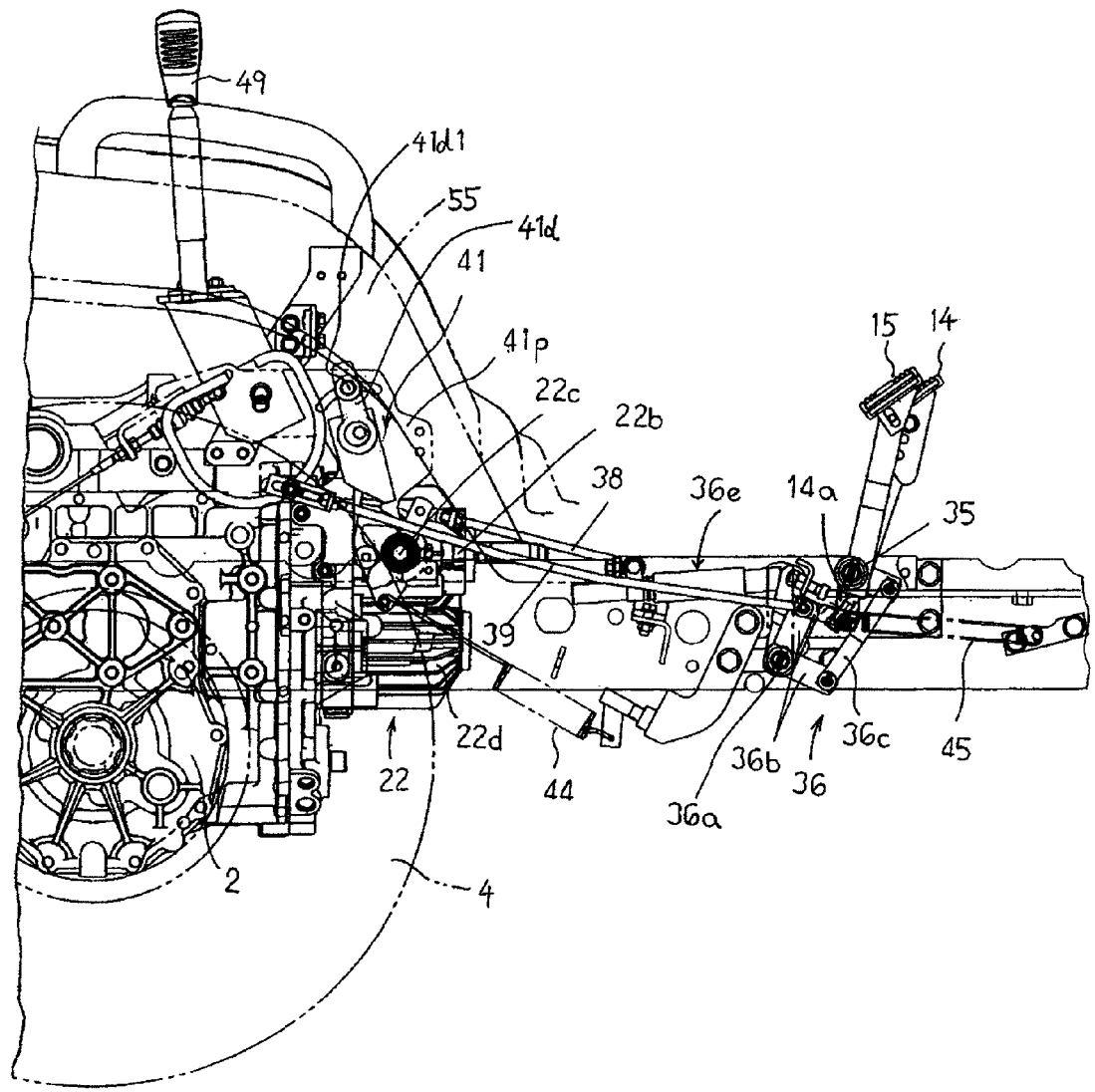
FIG. 6 is a side view of the pedals, the neutral return mechanism and the intermediate link mechanism.

Also as shown in FIG. 5 and FIG. 6, in the chassis frame 5, the forward pedal 14 and the reverse pedal 15 are disposed in parallel to the right and left and supported rotatably by a pedal support shaft 35 extending in a right/left direction, and an intermediate link mechanism 36 is disposed below the pedal support shaft 35. In FIG. 5, a portion is drawn as a line diagram to illustrate movements of the forward and reverse pedals 14 and 15, the intermediate link mechanism 36, the shift rod 38, etc., in an easily comprehensible manner.

The intermediate link mechanism 36 and the forward and reverse pedals 14 and 15, etc., shall now be described. An integral arm 36b, which is axially supported by an intermediate shaft 36a, is bent in a substantially V-shaped manner in side view, and extends upward and forward, is provided. A front end of the shift rod 38 is coupled by a pin to an upper end of the arm 36b. A rear end of the shift rod 38 is coupled to a trunnion arm 22g of the hydrostatic continuously variable transmission 22. The front end of the transmission rod 38 and an arm portion 14a of the forward pedal 14 are coupled to each other by an extension rod 38a, with the extension rod 38a being coupled by pins.

An arm portion 15a of the reverse pedal 15 and an upper end of a coupling rod 36c are coupled by a pin, a lower end of the coupling rod 36c is coupled by a pin to a front end of the arm 36b, and the hydrostatic continuously variable transmission 22 is thereby configured to shift between forward and reverse drives.

Thus when the forward pedal 14 is depressed, the arm portion 14a rotates integrally about the pedal support shaft 35 as a rotational center, and via the extension rod 38a, the shift rod 38 is moved in an F direction. The trunnion arm 22g is thereby rotated counterclockwise and the trunnion shaft 22c rotates in a forward drive direction.

On the other hand, when the reverse pedal 15 is depressed, the arm portion 15a of the reverse pedal 15 rotates integrally about the pedal support shaft 35 as the rotational center, and the coupling rod 36c moves in an R1 direction. The substantially Y-shaped arm 36b then rotates clockwise about the intermediate shaft 36a as the rotational center, and the shift rod 38 is thus moved in the R direction. The trunnion arm 22g is thereby rotated clockwise and the trunnion shaft 22c rotates in a reverse drive direction.

The forward pedal 14 and the reverse pedal 15 are mechanically coupled interlockingly by the intermediate link mechanism 36, and the forward pedal 14 and the reverse pedal 15 are thereby configured so that both cannot be depressingly actuated at the same time.

A second spring 45 is disposed between the arm portion 14*a*, which is configured integral with the forward pedal 14, and the vehicle body. Thus when the forward pedal 14 or the reverse pedal 15 is depressed, the second spring elongates, and when the stepping operation of the forward pedal 14 or the reverse pedal 15 is stopped, the second spring 45 returns to its original length, and the forward pedal 14 or the reverse pedal 15 is thereby returned to the original position (neutral position).

The intermediate shaft 36*a* is provided with a rod 36*d*, and the rod 36*d* is configured to move integrally with the arm 36*b*. A damper 36*e* is configured to be coupled to the other end of the rod 36*d*. By providing such a damper 36*e*, shock that arises when the forward or reverse pedal 14 or 15 is depressed can be alleviated. Also, when a foot is released from the forward or reverse pedal 14 or 15, the damper 36*e* acts as a resistance and rapid return of the forward or reverse pedal 14 or 15 to the neutral position can thereby be prevented.

Also, a front end of an auto-cruise rod 39 is pin-coupled to the upper end of the arm 36*b* of the intermediate link mechanism 36. An auto-cruise function is a function that makes the tractor run while maintaining a fixed speed. An auto-cruise lever 49 for switching on/off the auto-cruise function is axially supported in a manner enabling rotation about a shaft extending in the right/left direction, and a rear end of the auto-cruise rod 39 is pin-coupled to a lower end of an auto-cruise arm 49*b* that is integrated with the auto-cruise lever 49. Also, a brake arm 31*a*, actuated by the brake pedal 31, and the auto-cruise lever 49 are coupled together by a cable 50, and the auto-cruise lever 49 is thereby configured to switch from being on to off when the brake pedal 31 is depressed.

When the auto-cruise lever 49 is rotated forward about a rotational shaft 49*a*, the auto-cruise arm 49*b* moves the auto-cruise rod 39 in the F direction, so that the shift rod 38 also moves in the F direction. And the trunnion shaft 22*c* is thereby rotated in the forward drive direction via the trunnion arm 22*g*. The auto-cruise lever 49 is configured to be capable of being maintained at a position to which it is operated, and the vehicle body can thus run at the fixed speed even when the driver releases his/her hand from the auto-cruise lever 49. The speed is determined by the operation position of the auto-cruise lever 49.

Also, when the brake pedal 31 is depressed, the cable 50 acts on the auto-cruise lever 49 and rotates in the direction to which it returns the auto-cruise lever 49, thereby results in cancelling the auto-cruise function.

Also, a neutral return mechanism 41, which forcibly returns the trunnion shaft 22*c* of the hydrostatic continuously variable transmission 22 to a neutral position, is disposed at the rear of the trunnion shaft 22*c* of the hydrostatic continuously variable transmission 22.

A configuration of the neutral return mechanism 41 shall now be described. FIG. 5B shows a section taken along line S1-S1 in FIG. 5A.

An arcuate slot 41*h* is formed in a mounting base 41*p*, and an upper portion of an operation arm 41*d* is mounted on the slot 41*h* by a bolt 41*d*1. There is an interval between the operation arm 41*d* and the mounting base 41*p*, and a boss 41*d*2 is thus fixed to the operation arm 41*d*. A female thread portion is formed in the boss 41*d*2, and the operation arm 41*d* is fixed by inserting the bolt 41*d*1 in the female thread portion. The operation arm 41*d* can be adjusted along the arcuate slot 41*h* upon loosening the bolt 41*d*1 and then fixed again at a suitable position by the bolt 41*d*1.

A large-diameter pin 41*g* is fixed to a lower side of the operation arm 41*d*, a hole portion of a return arm 41*a* is fitted with the large-diameter pin 41*g*, and the return arm 41*a* is thereby mounted rotatably with respect to the large-diameter pin 41*g*. The return arm 41*a* is not fixed with respect to the large-diameter pin 41*g* and is configured to rotate about the large-diameter pin 41*g*. In disposing an eccentric shaft 41*e* in the large-diameter pin 41*g*, a center of the eccentric shaft 41*e* is disposed at a position P that is decentered from a central axial center Q of the large-diameter pin 41*g*. The eccentric shaft 41*e* is fitted in a hole in the mounting base 41*p*. 41*f* is a collar that fills a gap between the return arm 41*a* and the mounting base 41*p*.

By the above configuration, an axial center of the eccentric shaft 41*e* and that of the large-diameter pin 41*g* are separated by just a distance R. Thus when the bolt 41*d*1 is loosened and the operation arm 41*d* is adjusted along the arcuate slot 41*h*, the large-diameter pin 41*g* rotates about the axial center of the eccentric shaft 41*e*. That is, the large-diameter pin 41*g* rotates in directions of an arrow Y1 and an arrow Y2 shown in FIG. 5A. The return arm 41*a* is fitted in the large-diameter pin 41*g*, and the return arm 41*a* is thus configured to move in an up/down direction.

A lower portion of the return arm 41*a* is fixed by welding and is integrated with a lower return arm 41*a*L which is a separate member. A shaft 41*a*1 is disposed in the lower return arm 41*a*L, and a roller 41*b* is rotatably mounted on the shaft 41*a*1. Further, a pin 41*i* for latching a first spring 44 is disposed below the shaft 41*a*1.

Meanwhile, a curved surface portion 41*c*1 is formed in a cam plate 41*c* that rotates integrally with the trunnion shaft 22*c*, and the roller 41*b* is configured to fit in a concave portion formed by the curved surface portion 41*c*1. The trunnion shaft 22 is in the neutral position when the roller 41*b* is fitted in a bottommost portion of the concave portion of the cam plate 41*c*.

Deviation of the neutral position of the trunnion shaft 22*c* is eliminated by moving and adjusting the operation arm 41*d* along the slot 41*h* of the base 41*p* of the operation arm 41*d* so that the trunnion shaft 22*c* is set at the neutral position when the roller 41*b* is fitted in the concave portion of the cam plate 41*c*.

The roller 41*b* is mounted to one side of the lower return arm 41*a*L, and a second lower return arm 41*a*R, which is a member of the same shape as the lower return arm 41*a*L, is configured to sandwich the roller 41*b* with the second lower return arm 41*a*R, that is, the roller 41*b* and a portion of the cam plate 41*c* are disposed between the lower return arm 41*a*L and the second lower return arm 41*a*R. In terms of illustration, the second lower return arm 41*a*R is omitted and a state where it is removed is shown.

When the forward or reverse pedal 14 or 15 is depressed, the cam plate 41*c* rotates together with the trunnion shaft 22*c*, and the curved surface portion 41*c*1 of the cam plate 41*c* thus pushes the roller 41*b* in an arrow Y3 direction. The lower return arm 41*a*L, on which the roller 41*d* is mounted, and the return arm 41*a*, which is integrated with the lower return arm 41*a*L, thus rotate in the arrow Y3 direction (clockwise) about the large-diameter pin 41*g*. The first spring 44 elongates in this process, and thus when the depression operation of the forward or reverse pedal 14 or 15 is stopped, the trunnion shaft 22*c* is automatically returned to the neutral position by the action of the first spring 44 returning to its original state.

As mentioned above, by rotatingly adjusting the operation arm 41*d* along the arcuate slot 41*h*, the return arm 41*a* and the lower return arm 41*a*L are moved in the up/down direction. By the movement of the return arm 41*a* and the lower return arm 41*a*L in the up/down direction, the roller 41*b* is also moved together in the up/down direction, and by the movement of the roller 41*b* in the up/down direction, the curved surface portion 41*c*1 of the cam plate 41*c* is pressed, the cam plate 41*c* is thereby rotated, and the trunnion shaft 22*c*, which is integrated with the cam plate 41*c*, is rotated.

Such an operation is performed when adjusting the neutral position of the trunnion shaft 22*c*. Deviation of the neutral position of the trunnion shaft 22*c* occurs due to deterioration with age of the vehicle body, and the above-described adjustment is performed to eliminate this deviation. Adjustment of the neutral position of the trunnion shaft 22*c* is also necessary by dimensional errors according to vehicle body during assembly and maintenance, and the above-described adjustment is performed in such cases as well.

When the brake pedal 31 is depressed, the arm 31*a* rotates in the clockwise direction, and the intermediate link mechanism 36 and the forward or reverse pedal 14 or 15 are returned to the neutral positions via the auto-cruise rod 39. At the same time, the trunnion shaft 22*c* of the hydrostatic continuously variable transmission 22 returns to the neutral position.

As mentioned above, when the foot is removed from the forward pedal 14 or the reverse pedal 15, the intermediate link mechanism 36, the forward pedal 14 and the reverse pedal 15 are returned to the neutral positions by being pulled by the second spring 45, and the trunnion shaft 22*c* of the hydrostatic continuously variable transmission 22 also returns to the neutral position. The neutral position is achieved by the action of the first spring 44 via the neutral return mechanism 41. Thus running can be performed while adjusting the running speed and return to neutral of the trunnion shaft 22*c* can be performed promptly without using the brake pedal 31 much.

The first spring 44 is thus made to act directly on the neutral return mechanism 41 that returns the trunnion shaft 22*c* of the hydrostatic continuously variable transmission 22 to the neutral position, and the second spring 45 is made to act directly on the intermediate link mechanism 36 that is linked to the forward and reverse pedals 14 and 15, and the neutral return mechanism 41 can thus be returned to the neutral position by the first spring 44 and the intermediate link mechanism 36 can be returned to the neutral position by the second spring 45.

Also, spring constants of the first spring 44 and the second spring 45 can be selected separately, and loads acting on the neutral return mechanism 41, the intermediate link mechanism 36, the forward pedal 14 and the reverse pedal 15 can thus be dispersed.

With the neutral return mechanism 41 for the trunnion shaft 22*c* of the hydrostatic continuously variable transmission 22, resistance against return is increased by deterioration with age and the return to the neutral position is thereby made difficult. Here, if a tension of the first spring 44 that makes the neutral return mechanism 41 return to the neutral position is adjusted to be strong, a problem of an overall operation load being strong and smooth operation being difficult occurs. However, such a problem can be resolved by the above-described configuration.

The trunnion shaft 22*c* of the hydrostatic continuously variable transmission 22 can thus be returned directly to the neutral position by the first spring 44 and the neutral return mechanism 41. Further, the intermediate link mechanism 36 is returned to the neutral side by the second spring 45, and thus even if resistances act on the neutral return mechanism 41 and the intermediate link mechanism 36, the return of the trunnion shaft 22*c* to the neutral position can be performed readily by the respective springs 44 and 45.

Also in linking the second spring 45 to the intermediate link mechanism 36, the arm 14*a* of the forward pedal 14, in other words, the forward pedal 14 is directly coupled to the second spring 45, and the return of the forward pedal 14 to the neutral position is thus performed smoothly. In comparison to the reverse drive side, movement at high speed is mostly performed at the forward drive side, and by the return of the forward pedal 14 to the neutral position being performed smoothly, a time until stoppage from release of the foot from the forward pedal 14 is shortened.

Another embodiment shall now be described based on FIG. 7.

In coupling the first spring 44 to the return arm 41*a* of the neutral return mechanism 41 that returns the trunnion shaft 22*c* of the hydrostatic continuously variable transmission 22 to the neutral position, the following configuration may be employed. That is, the first spring 44 is divided into a main first spring 44*a* and an auxiliary first spring 44*b*, and the tension of the auxiliary first spring 44*b* is set weaker than the tension of the main first spring 44*a* by, for example, approximately 30%. A single pin 46 is disposed at a tip of the return arm 41*a*, and with respect to the pin 46, the auxiliary first spring 44*b* is coupled in a manner of downward gradual inclination toward the front and the main first spring 44*a* is coupled in a manner of inclining sharply downward toward the front compared to the inclination of the auxiliary first spring 44*b*.

Pins 46*a* and 46*b* may instead be disposed at the tip of the return arm 41*a*, the main first spring 44*a* may be coupled to the pin 46*a*, and the auxiliary first spring 44*b* may be coupled to the pin 46*b* as shown in FIG. 7B.

By the above arrangements, the returning force near the neutral position of the return arm 41*a* of the neutral return mechanism 41 is applied by pulling by the springs 44*a* and 44*b* of two directions to stabilize the tensile load and stabilize the return to the neutral position.

Figure 8:
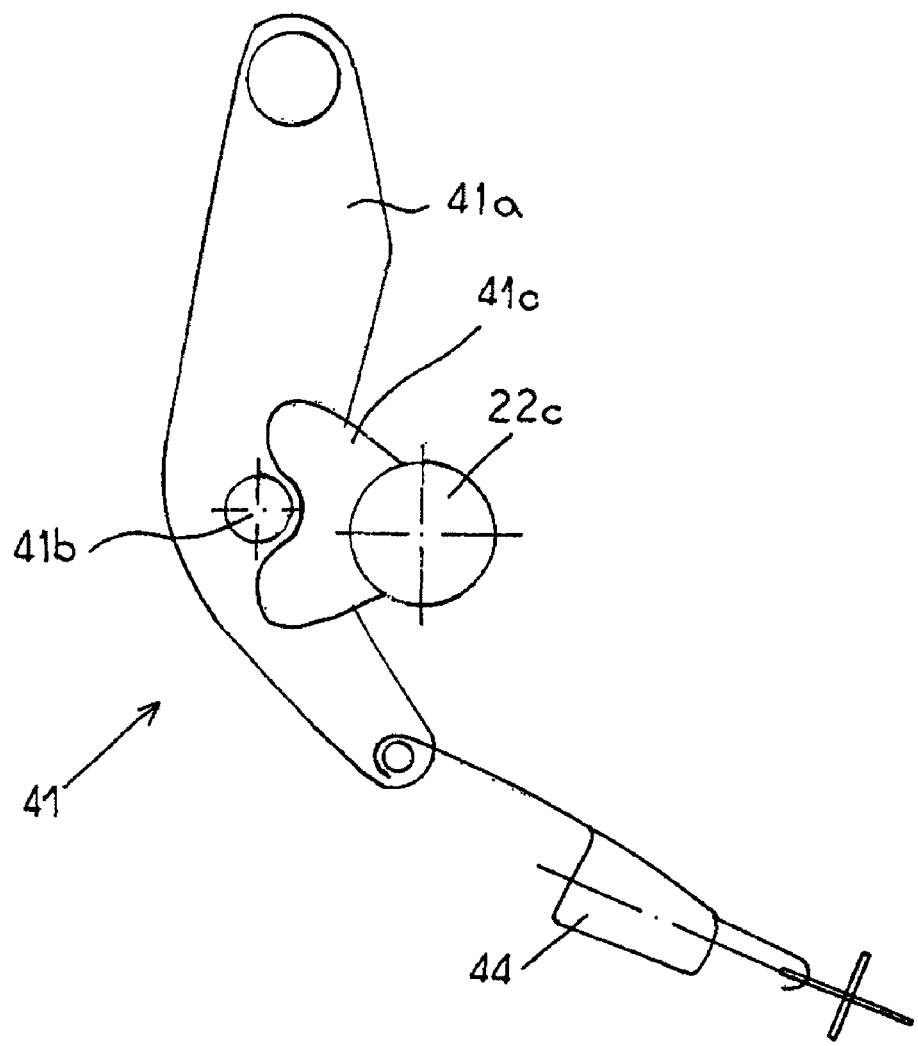
FIG. 8 is a side view of the neutral return mechanism.

Also, the first spring 44 may be arranged as shown in FIG. 8. The first spring 44 is made small in winding diameter at one side and large in winding diameter at the other end so that the spring load does not change from the neutral position of the trunnion shaft 22*c* to, for example, up to ⅔th of the pulling range of the spring and so that an operation force of the return arm 41*a* does not exceed a predetermined value.

Figure 9:
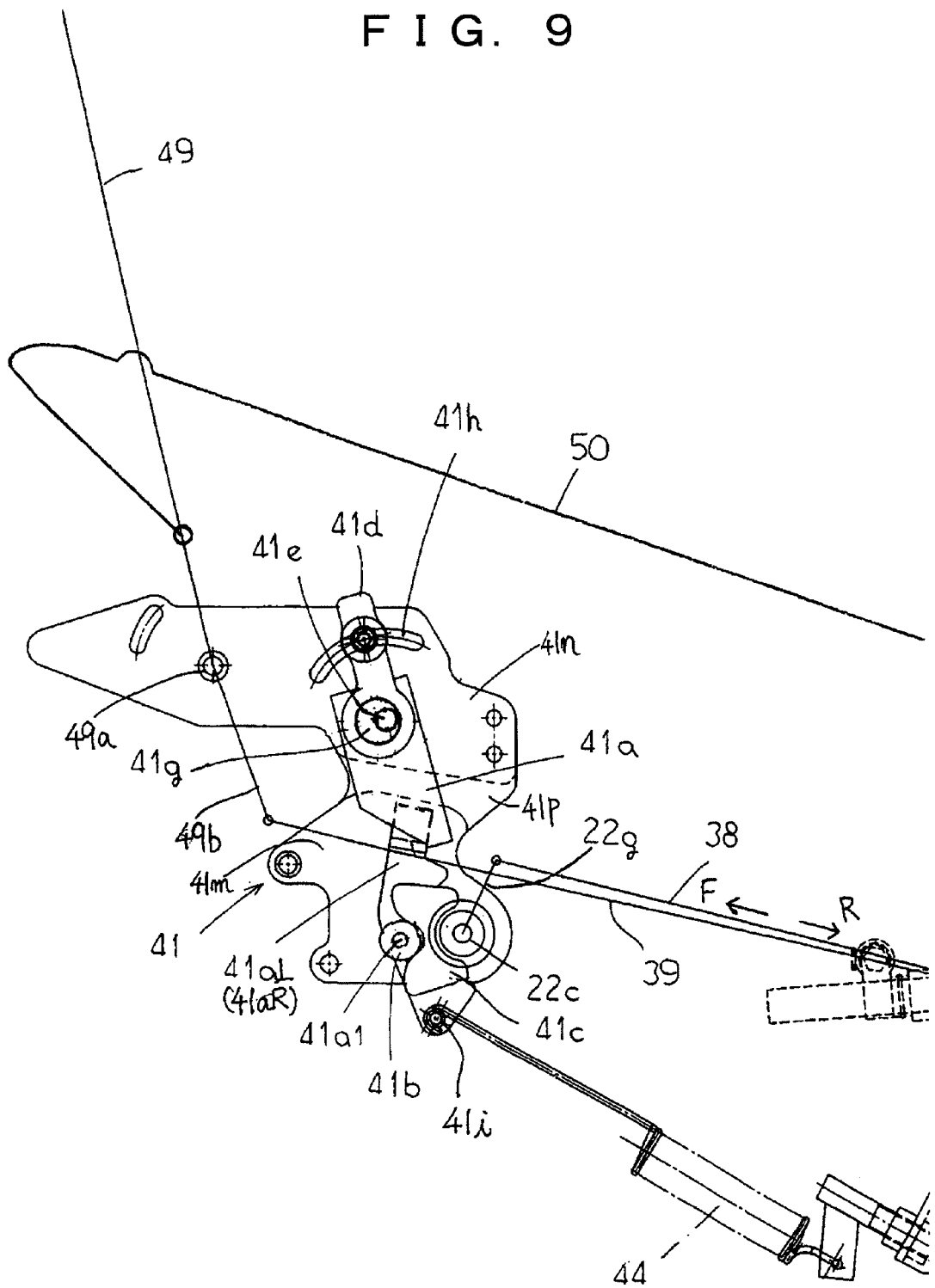
FIG. 9 is a side view of a vicinity of the neutral return mechanism.

Another embodiment of the neutral return mechanism 41 shall now be described based on FIG. 9.

The neutral return mechanism 41 is configured as follows. That is, the mounting base is dividingly configured with a lower base 41*m*, an upper base 41*n*, and a coupling base 41*p* that supports these bases, and the bases 41*m*, 41*n*, and 41*p* are configured to be capable of being adjustingly fixed by bolts and nuts.

With a configuration where the neutral return mechanism 41 is mounted on a single substrate, centering of the neutral position of the trunnion shaft 22*c* is difficult.

However, with the above-described configuration, neutral position adjustment of the trunnion shaft 22*c* can be performed easily and maintainability can be improved.

Figure 10:
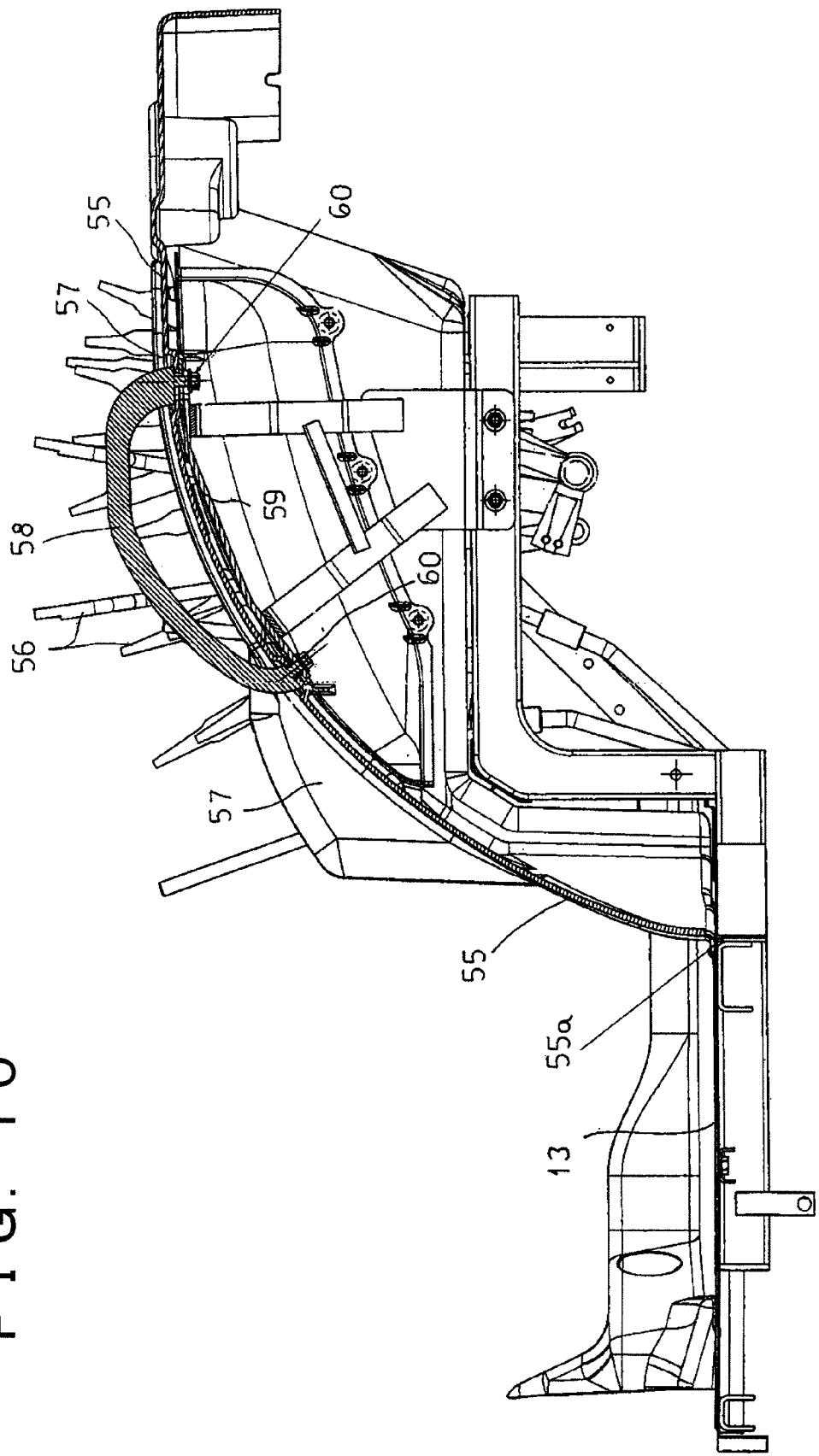
FIG. 10 is a side view of a fender.

A mounting configuration for the fender 55 shall now be described based on FIG. 10. The fender 55 is made of synthetic resin, and operation levers 5 and 6 and a guiding operation panel 57 are integrated with an inner side of the fender 55. For reinforcement, a forwardly bent portion 55*a* is disposed at a front end of the fender 55, and the bent portion 55*a* is insertingly connected to a lower surface of a rear end of the floor 13. In assembling together the floor 13 and the fender 55 that are made of synthetic resin, rivets made of synthetic resin are used so that you may prevent them from overtightening.

Also, in mounting a hand catcher 58 onto the fender 55, the hand catcher 58 is configured to an inverted U-shape in side view, front and rear ends of the hand catcher 58 are inserted from above respectively into front and rear mounting holes of the fender 55, the front and rear ends are inserted and supported respectively in hole portions of a reinforcing stay 59, and nuts 60 are screwed and fastened onto threaded portions to secure stable tightening torques.

Figure 16:
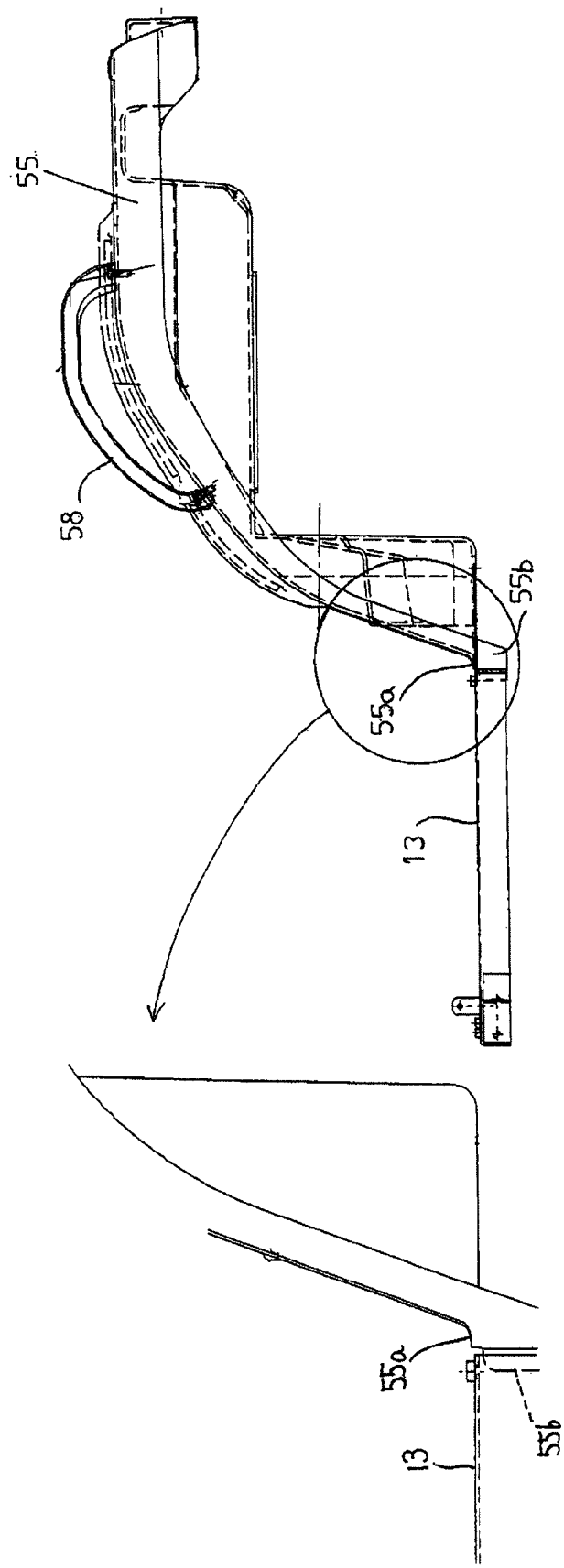
FIG. 16 shows a side view and a plane view of the fender.

Also as shown in FIG. 16, a lower protruding portion 55b, which protrudes forward beyond the bent portion 55a at the front end of the fender 55, may be formed below the bent portion 55a, the bent portion 55a may be made to approach the rear end of the floor 13 while leaving a slight gap, and the lower protruding portion 55b may be inserted below the floor 13. By this arrangement, deformation that occurs when a force is applied to the fender 55 can be received by the rear end of the floor 13 and mounting can be achieved while lessening the bolts and nuts for fastening together the fender 55 and the frame portion.

Figure 11:
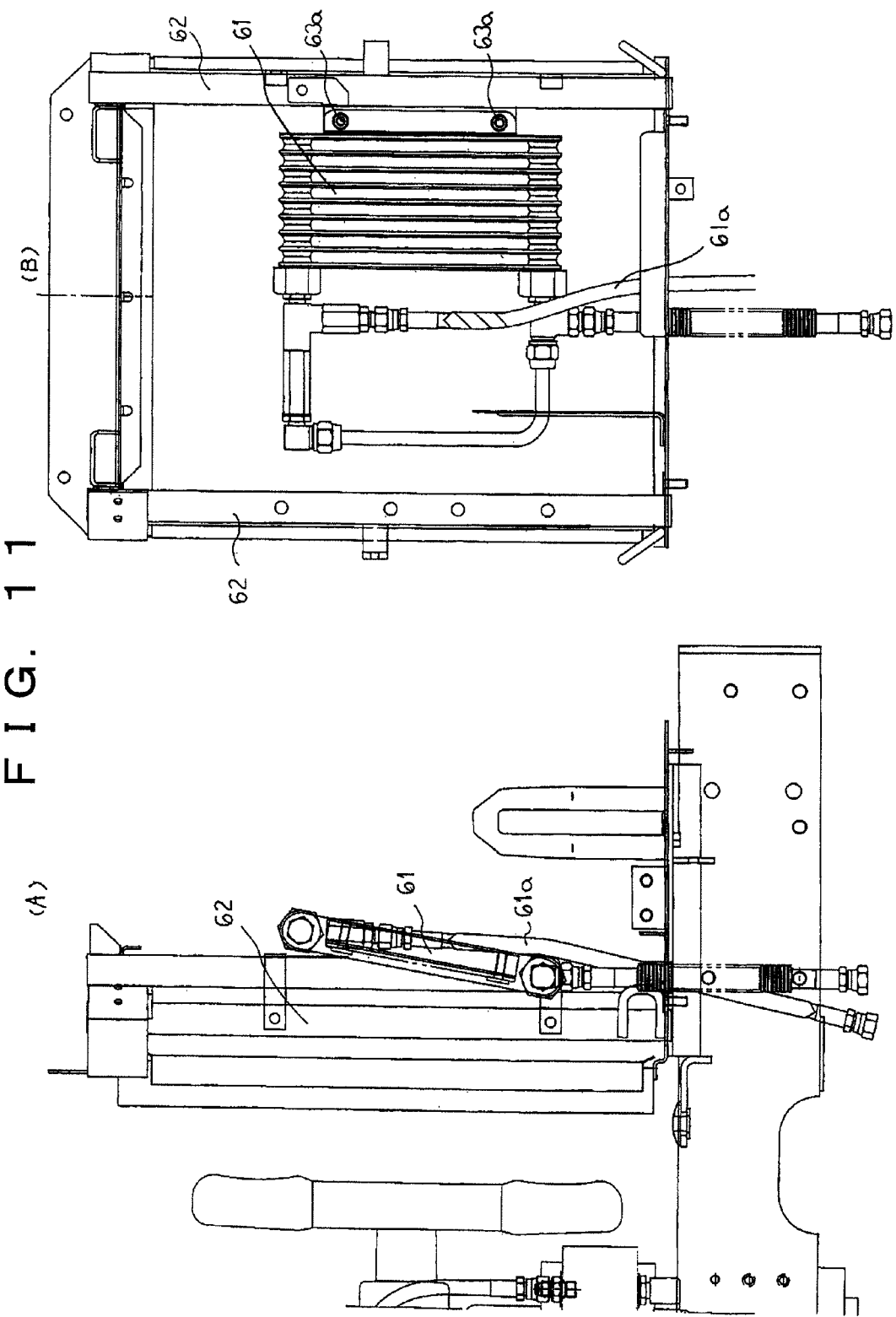
FIG. 11 shows a side view and a front view of an oil cooler.

A mounting configuration for an oil cooler 61 for hydraulic equipment shall now be described based on FIG. 11. FIG. 11A is a side view and FIG. 11B is a front view. At a mounting frame 62 disposed in front of the engine (not shown), the oil cooler 61 is supported by upper and lower mounting elements 63a and 63b in a manner of inclining upward toward the front in side view so that an upper portion thereof is disposed in the front and a lower portion thereof is disposed in the rear. By this configuration, a connection hose 61a can be lowered rectilinearly downward from the upper portion of the oil cooler 61, and bend of the connection hose 61a and clogging due to debris, etc. while lessening stress can be avoided.

Figure 12:
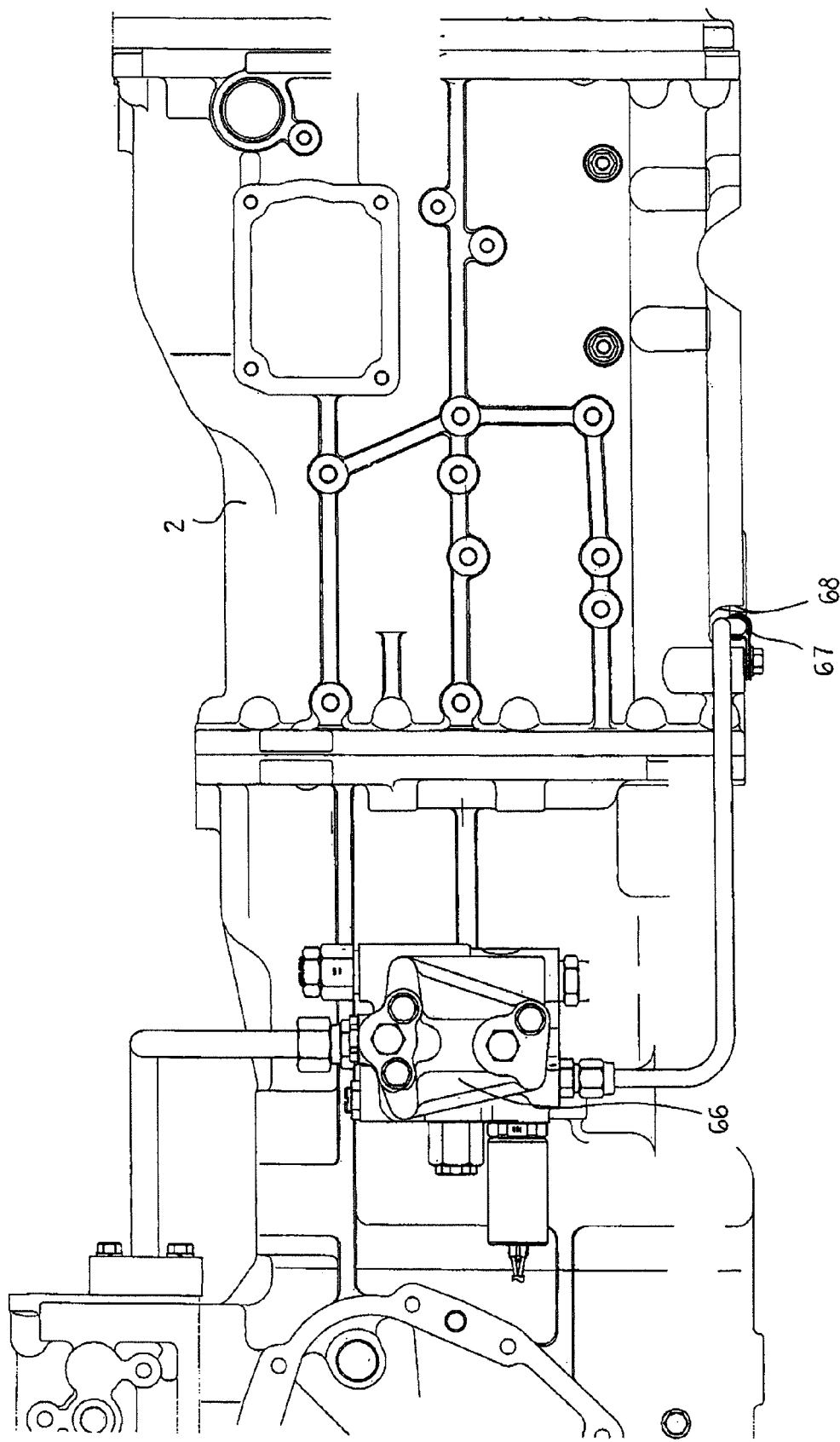
FIG. 12 is a side view of the transmission case.
Figure 13:
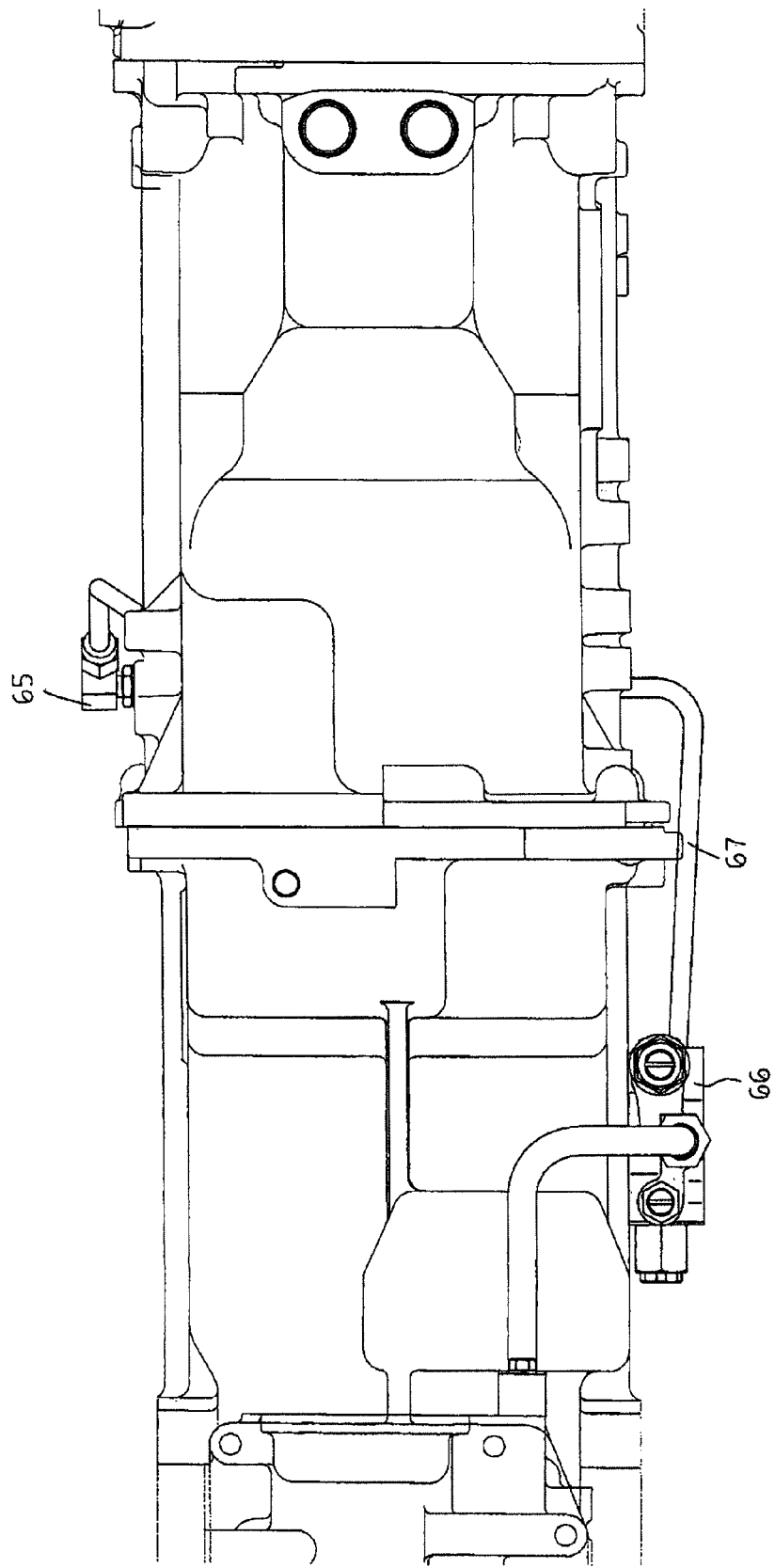
FIG. 13 is a bottom view of the transmission case.

A hydraulic piping configuration at a lower portion of the transmission case 2 shall now be described based on FIG. 12 and FIG. 13. For example, a PTO clutch valve 65 is disposed at one of either the right or the left side of the transmission case 2, a hydraulic pump 66 is disposed at the other of the right or the left side, and in connecting these members by a hydraulic piping 67, the piping 67 is routed by being fitted into and passed through a concave groove 68 formed along a bottom of the transmission case 2 in the right/left direction. Entanglement of grasses, contacting of stones, etc. can thereby be avoided to prevent the piping 67 from damaging.

Figure 14:
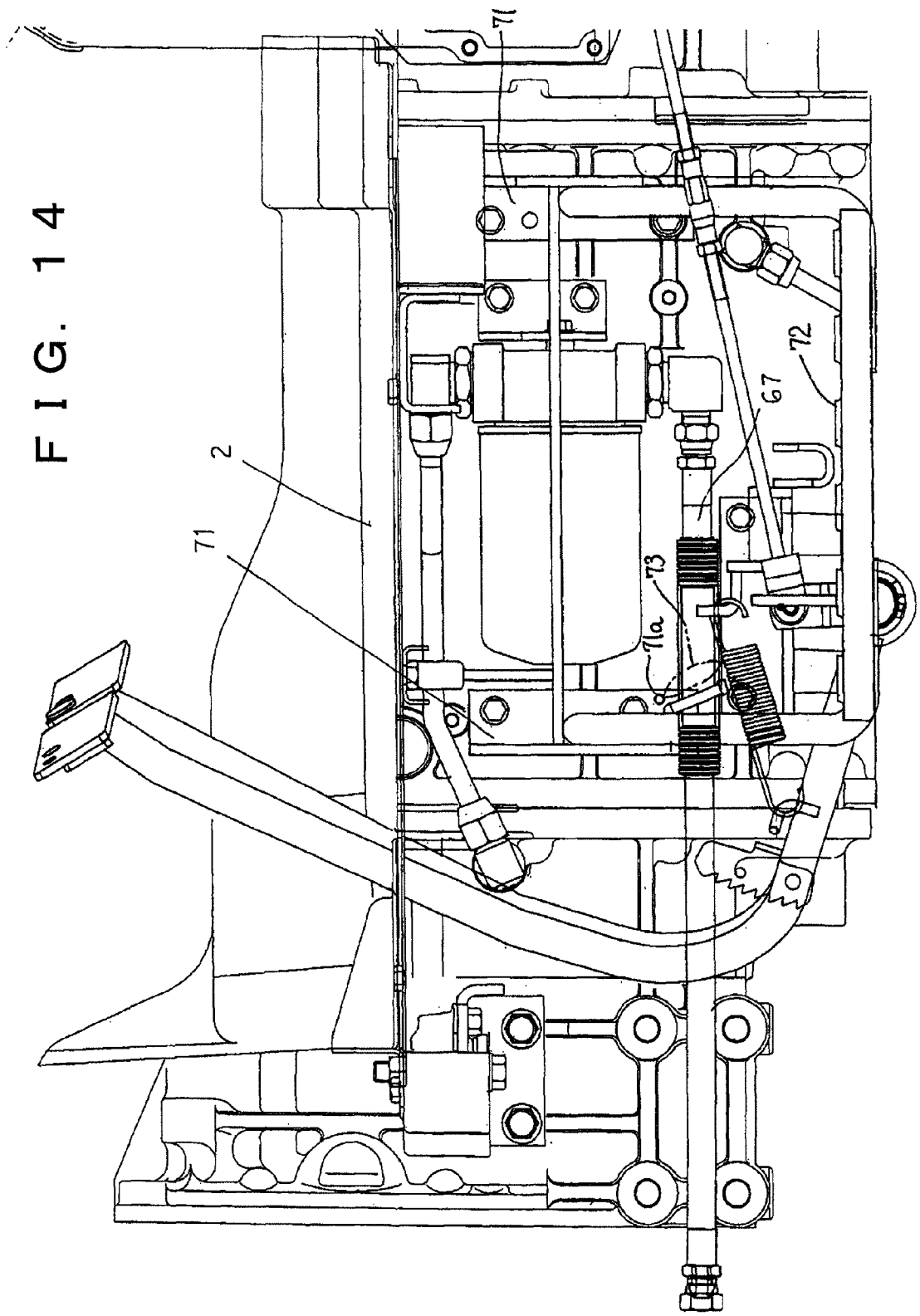
FIG. 14 is a side view of the transmission case.
Figure 15:
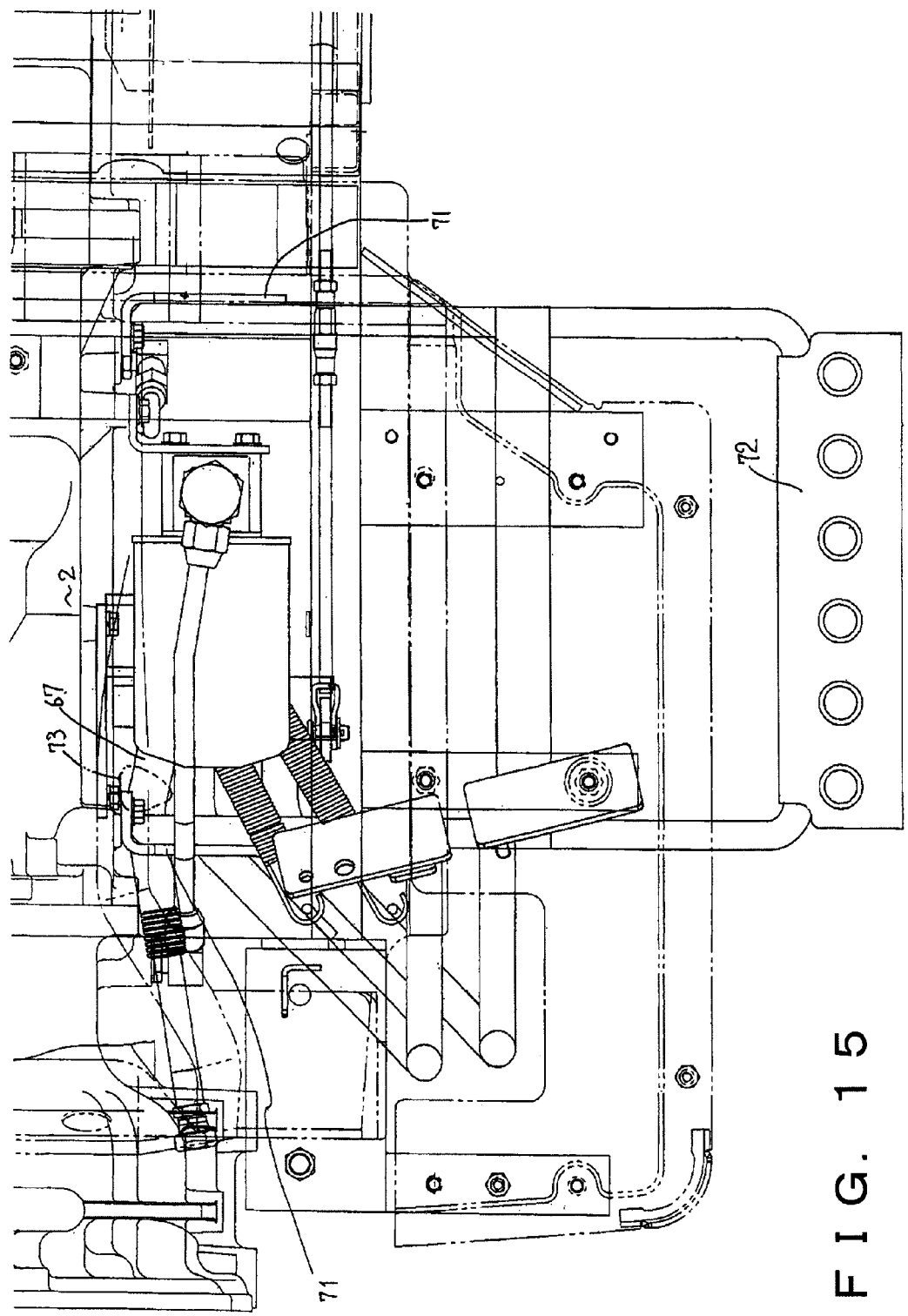
FIG. 15 is a plane view of the transmission case and a step.

A supporting configuration of the piping 67 for hydraulic equipment shall now be described with reference to FIG. 14 and FIG. 15.

A sub step 72 is mounted via mounting stays 71 onto the transmission case 2. In routing the hydraulic piping 67 on the right and the left sides of the transmission case 2, one side of a clamp 73 is supported by using a hole 71a of the mounting stay 71, and the piping 67 is supported by the other side of the clamp 73. A supporting configuration for the piping 67 can thereby be simplified while promoting shared use of parts.

Figure 18:
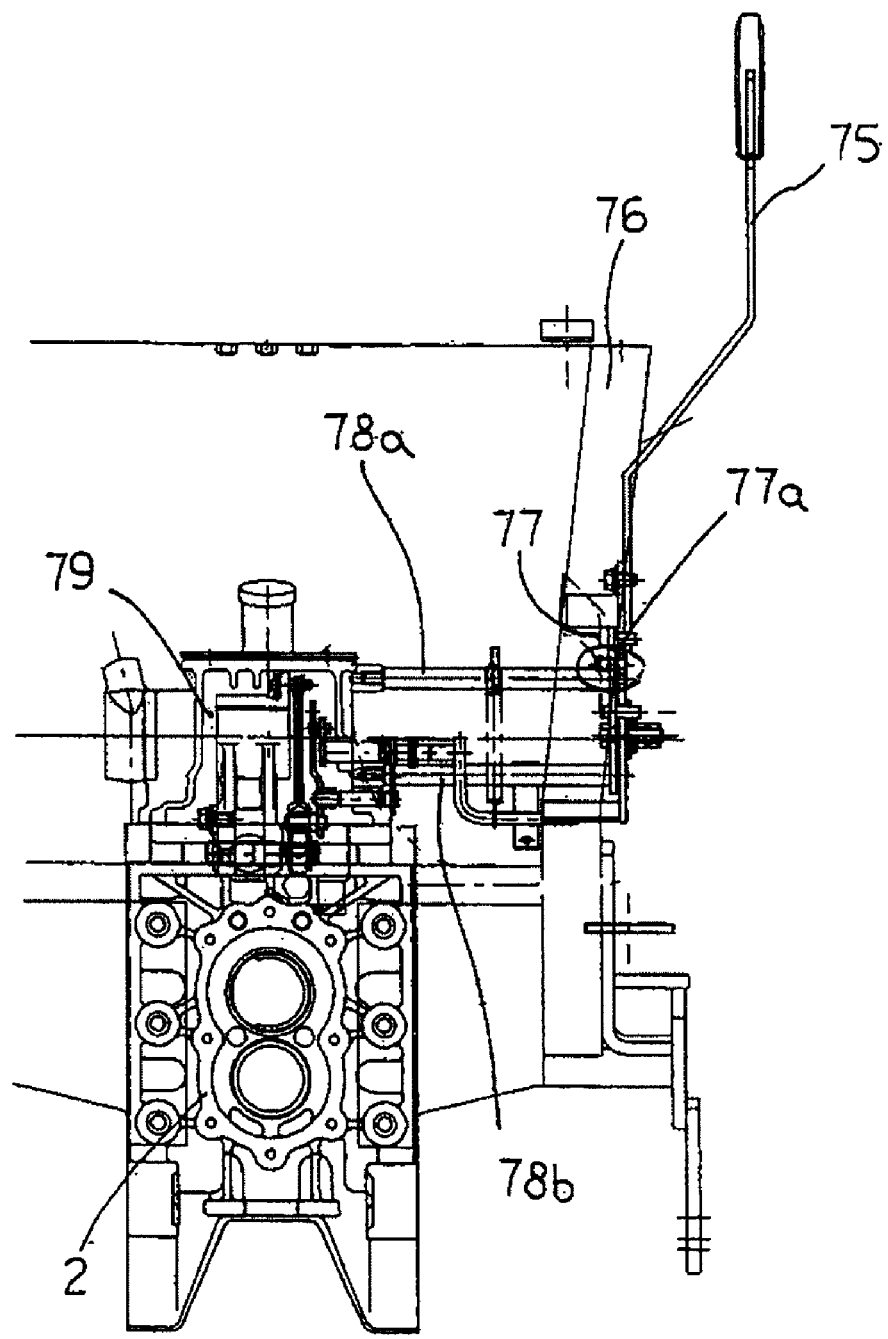
FIG. 18 is a front view of the transmission and the working machine lifting or lowering lever.

A mounting configuration for a working machine lifting or lowering lever 75 shall now be described based on FIG. 17 and FIG. 18.

The configuration of FIG. 17 slightly differs in the configuration of the hydrostatic continuously variable transmission in comparison to the configuration of FIG. 2, FIG. 5, FIG. 6, etc. A rear frame 76 is erected at a rear portion of the transmission case 2, and one end of a bracket 77 is axially supported on the rear frame 76 by a pin 77a extending in the right and the left direction. A pair of long, upper and lower mounting bolts 78a and 78b are attached to the bracket 77 while being directed toward the inner side, and the upper and lower mounting bolts 78a and 78b are screwed into threaded holes of a cylinder case 79 mounted on an upper portion of the transmission case 2 to mount the bracket 77 firmly.

By the above configuration, the working machine lifting or lowering lever 75 can be supported firmly, and lifting and lowering of a working machine can be performed accurately. Also, in supporting the upper and lower mounting bolts 78a and 78b in the bracket 77, by fitting and supporting with holes of some allowance, the upper and the lower mounting bolts 78a and 78b can be adjusted finely while screwing them into the threaded holes of the cylinder case 79.

Figure 19:
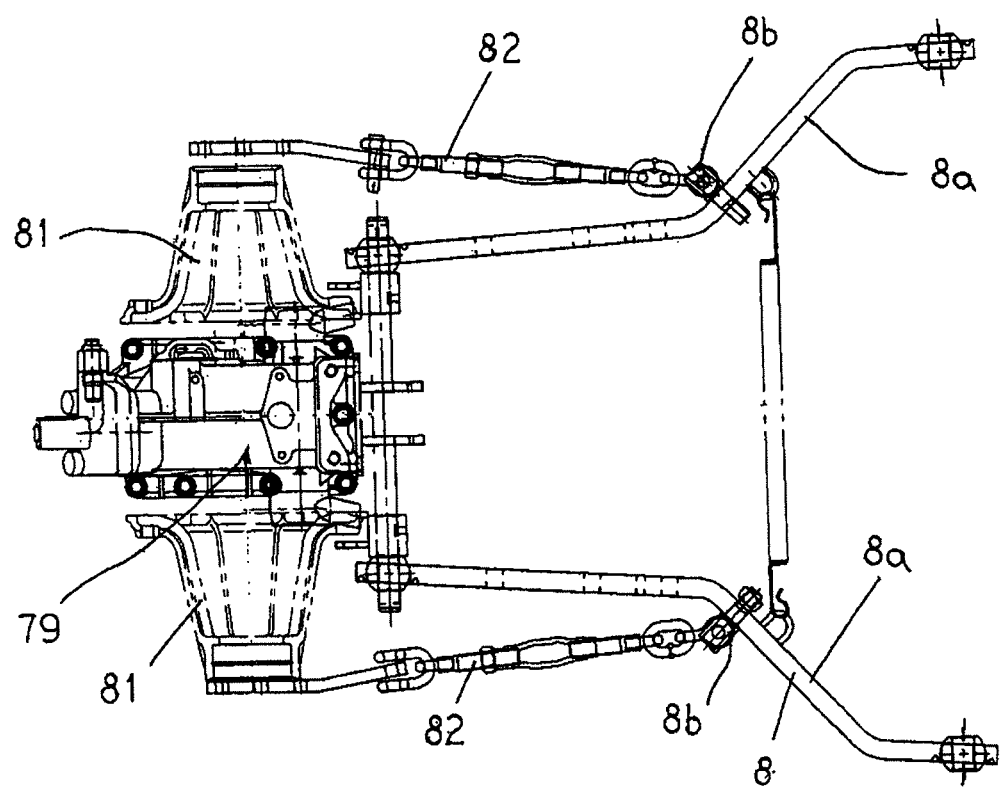
FIG. 19 is a plane view of a lift arm and a lower link.

A supporting configuration for lower links 8a of a three-point link mechanism 8 shall now be described based on FIG. 19 and FIG. 20.

The right and the left lower links 8a are axially supported in vertically rotatable manner on a rear portion of the transmission case 2, the right and left lift arms 7 are rotatably supported on the cylinder case 79, and lift rods 80 are coupled to the right and the left arms 7 to lift and lower the right and the left lower links 8a. Also, right and left rear axle cases 81 are mounted onto a rear portion of the transmission case 2 so as to protrude toward the right and the left sides respectively, coupling portions 8b are disposed at an intermediate portion of the right and the left lower links 8a so as to protrude downward and toward the right and the left sides respectively, and the coupling portions 8b are configured so that lower ends of the lift rods 80 and the lower ends of the lower links 8a may not overlap in side view. Front sides of the right and the left check chains 82 are mounted onto the right and the left sides respectively, of the right and the left rear axle cases 81, and rear sides of the check chains 82 are coupled to the coupling portions 8b to support the right and the left lower links 8a so as to pull them toward the right and the left sides respectively.

Figure 20:
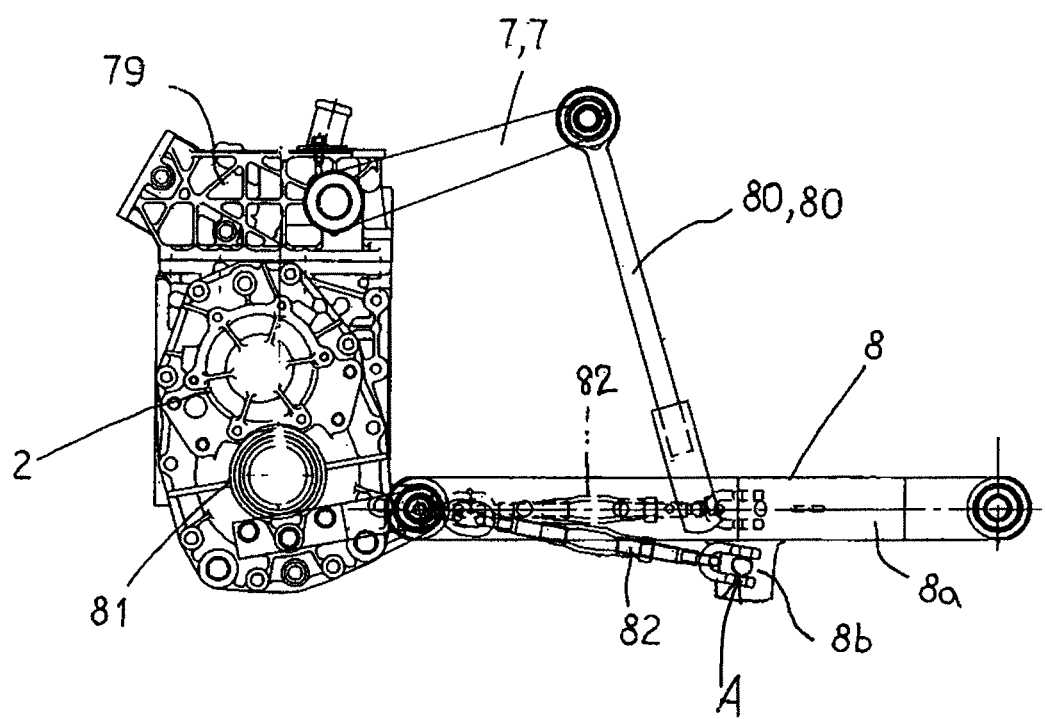
FIG. 20 is a side view of the lift arm and the lower link.

In FIG. 20, if the right and the left check chains 82 are disposed (hypothetical lines) so as to overlap with the right and the left sides respectively, of the right and the left lower links 8a in side view and coupled so as to overlap laterally with the lower ends of the lift rods 80 in side view, the right and the left lower links 8a then swing to the right and the left during work, causing a problem of wear of the lower ends of the right and the left lift rods 80 due to contact and thus degradation of durability. However, by the above-described arrangement, this problem can be resolved.

What claims are:
1. A working vehicle having a vehicle body frame, comprising:
   a front wheel;
   a rear wheel;
   a fender disposed at a position covering the rear wheel from above;
   a hydrostatic continuously variable transmission having a trunnion shaft;
   a forward pedal;
   a reverse pedal;
   a brake pedal;
   an intermediate link mechanism operating in linkage with operation of the forward pedal or the reverse pedal, and coupled to the forward pedal and the reverse pedal, respectively;
   a single shift rod receiving the operation from the intermediate link mechanism and rotating the trunnion shaft of the hydrostatic continuously variable transmission from a forward drive side to a reverse drive side;
   a neutral return mechanism disposed between the rear wheel and the fender in side view and having a cam plate rotating integrally with the trunnion shaft and forming a curved surface portion;
   a roller moving in contact with the curved surface portion;
   a lower return arm having the roller mounted thereon;
   a return arm having one end fixed to the lower return arm;

a first spring linked to an end of the lower return arm and acting in a direction of returning the trunnion shaft to the neutral position;

a second spring linked to the intermediate link mechanism to make the trunnion shaft act in a direction of returning to a neutral position when depression of the forward and reverse pedals is not being performed; and a damper coupled to the intermediate link mechanism for applying resistance to movements of the forward and the reverse pedals.

2. The working vehicle according to claim 1, further comprising:

an operation arm for adjusting the trunnion shaft to the neutral position by displacing rotational axis centers of the return arm and the lower return arm.

\* \* \* \* \*